United States Patent
Huang (10) Patent No.: US 7,616,535 B2
(45) Date of Patent: Nov. 10, 2009

(54) METHOD FOR DETERMINING TRACK SEARCHING DIRECTION

(75) Inventor: Yushyang Huang, Hsinchu (TW)

(73) Assignee: Sunext Technology Co., Ltd., Hsinchu (TW)

( * ) Notice: Subject to any disclaimer, the term of this patent is extended or adjusted under 35 U.S.C. 154(b) by 436 days.

(21) Appl. No.: 11/735,884

(22) Filed: Apr. 16, 2007

(65) Prior Publication Data

US 2008/0037389 A1 Feb. 14, 2008

(30) Foreign Application Priority Data

May 18, 2006 (TW) ............... 95117615 A (51) Int. Cl.
*G11B 7/00* (2006.01)
(52) U.S. Cl. ............... 369/44.28; 369/44.29
(58) Field of Classification Search ......... 369/44.28, 369/44.29, 30.01, 130.13
See application file for complete search history.

(56) References Cited

U.S. PATENT DOCUMENTS

| | | | |
|---|---|---|---|
| 5,914,922 A * | 6/1999 | Supino et al. | 369/44.28 |
| 7,120,095 B2 * | 10/2006 | Ma et al. | 369/44.28 |
| 2005/0219971 A1 * | 10/2005 | Shih et al. | 369/44.28 |

* cited by examiner

*Primary Examiner*—Thang V Tran
(74) *Attorney, Agent, or Firm*—J.C. Patents (57) ABSTRACT

A method for determining a track searching direction is disclosed. The method takes advantage of the characteristic that the movement of the photo-diode with respect to the optical disk is not perpendicular to the track direction. Therefore, the phase difference between the front side and the rear side of the photo-diode could be used to define a seeking error signal. The seeking error signal is used, together with a tracking error (TE) signal and a radio frequency ripple (RFRP) signal, to determine the track searching direction. Because the seeking error signal has a better signal-to-noise ratio, the phase lead or lag can be determined more accurately. As a result, the accuracy of detecting the track searching direction on a blank disk is improved.

10 Claims, 6 Drawing Sheets

METHOD FOR DETERMINING TRACK SEARCHING DIRECTION

CROSS-REFERENCE TO RELATED APPLICATION

This application claims the priority benefit of Taiwan application serial no. 95117615, filed May 18, 2006. All disclosure of the Taiwan application is incorporated herein by reference.

BACKGROUND OF THE INVENTION

1. Field of the Invention

The present invention relates to a track searching method, and more particularly, to a method for determining a track searching direction of an optical pick-up head.

2. Description of Related Art

Figure 1:
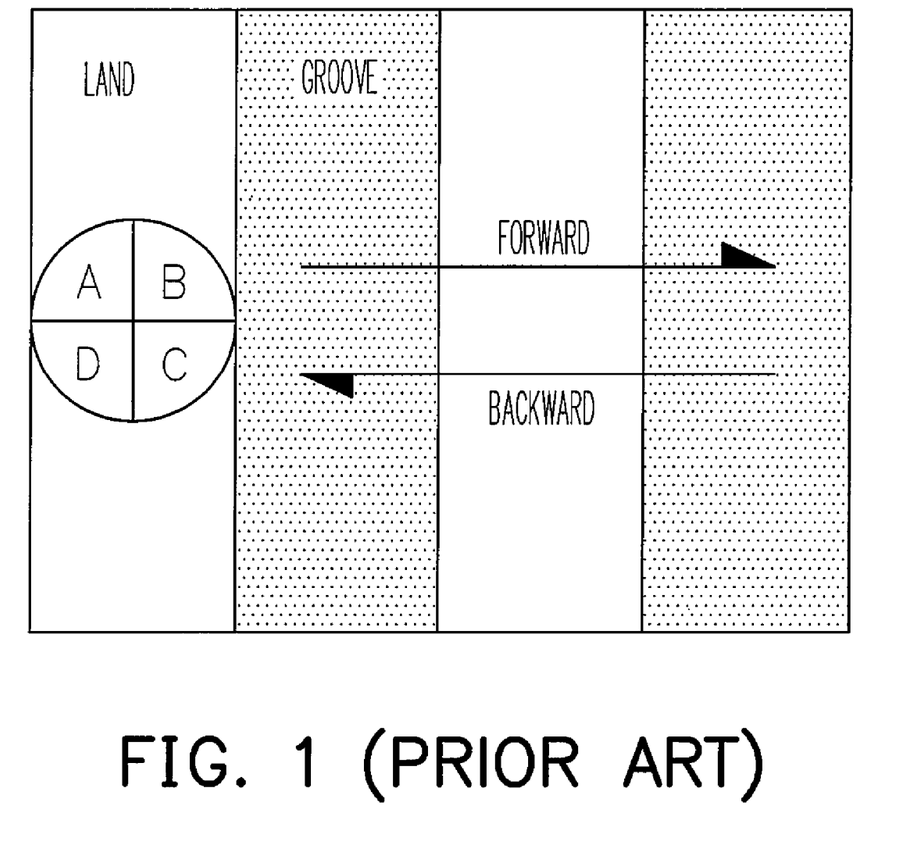
FIG. 1 is a diagram showing a conventional track searching method.

FIG. 1 is a diagram showing a conventional track searching method. As shown in FIG. 1, the blank portions are tracks (or lands) of an optical disc and the dotted portions are grooves of the optical disc. In addition, the illuminated area on the optical disc produced by the optical pick-up head can be divided into four blocks A, B, C and D according to their locations. Tracking error can be calculated using the formula TE=(A+D)−(B+C). When the photo-diode (PD) in the optical pick-up head moves into the middle of a track, the tracking error signal is equal to a particular reference voltage. When the photo-diode moves to the right, because the area B and the area C have moved into a darker groove, the value of (A+D)−(B+C) starts to increase. On the contrary, when the photo-diode moves to the left, the area A and the area D have moved into a darker groove so that the value of (A+D)−(B+C) starts to decrease.

Figure 2:
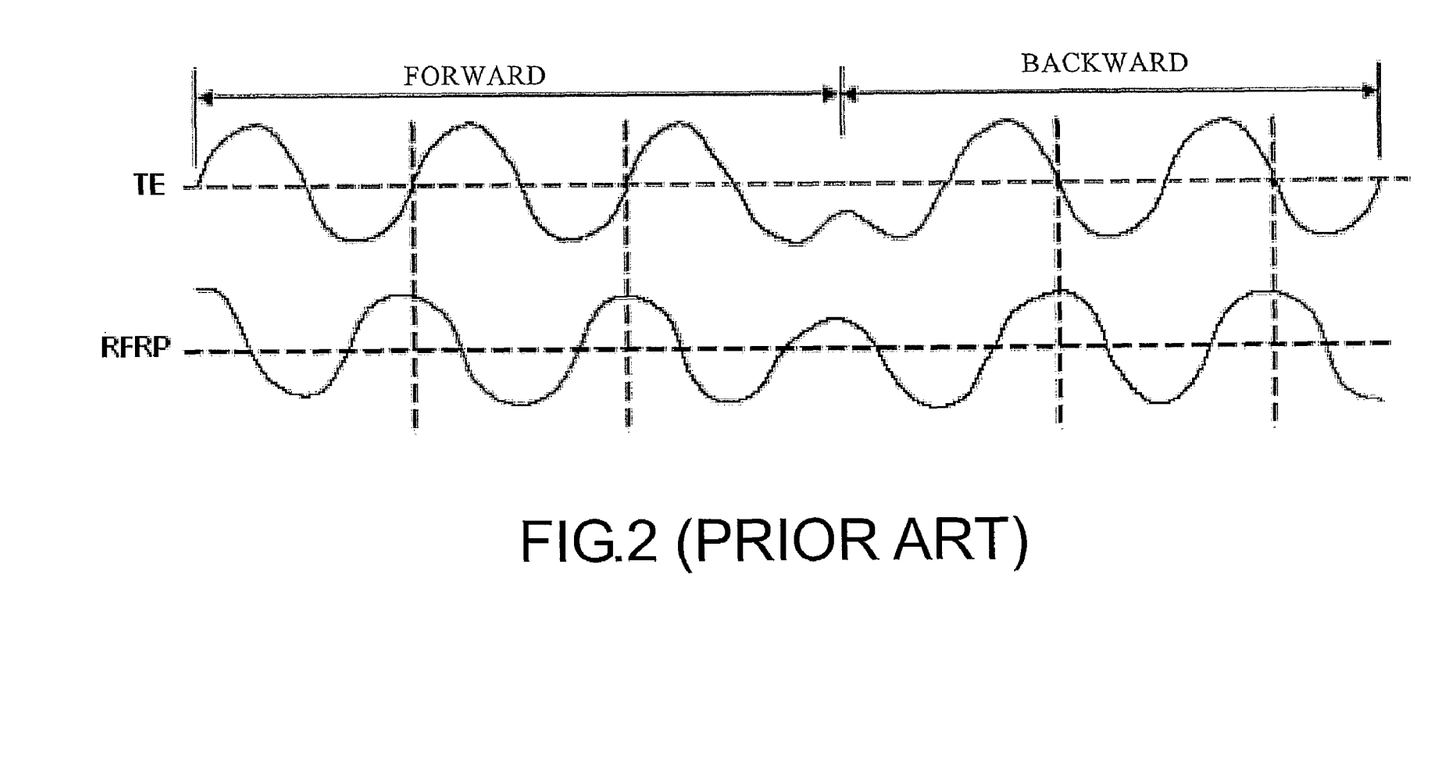
FIG. 2 is a diagram showing the traces of a tracking error signal and a radio frequency ripple signal next to each other to contrast their phases.

On the other hand, the conventional method of calculating the radio frequency ripple (RFRP) value is RFRP=(A+B+C+D). When the photo-diode is in the middle of a track, the RFRP value is the largest. When the photo-diode moves either to the left or to the right, the RFRP value starts to decrease. Therefore, when the RFRP value leads the TE signal by a phase angle of 90°, the track searching direction is determined to be forward. Conversely, when the TE signal leads the RFRP value by a phase angle of 90°, the track searching direction is determined to be backward (as shown in FIG. 2).

The foregoing method of determining a track searching direction has been widely adopted for reading data from optical disc. However, when the same method is applied to a recordable optical disc system, track searching has to be carried out on a blank optical disc. Because the grooves of the optical disc have no written data (marks or pits), the brightness/darkness contrast between the lands and the grooves is rather small. Hence, the signal-to-noise ratio of the RFRP signal is rather low and the phase difference between the RFRP and the TE signal cannot be contrasted reliably.

SUMMARY OF THE INVENTION

Accordingly, at least one objective of the present invention is to provide a method of determining a track searching direction. The phase difference between the front side and the rear side photo-sensors in an optical pick-up head is used to define a seeking error signal. Then, the seeking error signal together with the tracking error signal is used to determine the track searching direction.

Another objective of the present invention is to provide a method of determining a track searching direction. The seeking error signal together with a radio frequency ripple signal is used to determine the track searching direction.

To achieve these and other advantages and in accordance with the purpose of the invention, as embodied and broadly described herein, the invention provides a method of determining a track searching direction, in particular, suitable for determining a track searching direction of an optical pick-up head. The optical pick-up head includes four photo-sensors for reading the light intensities of a main beam reflected from a top left position (A), a top right position (B), a bottom right position (C) and a bottom left position (D). The track searching method includes the following steps. First, a seeking error (SE) is calculated to obtain a seeking error signal, wherein SE=(A−B)−(D−C) and A, B, C and D represent the respective light intensities of the reflected main beam as measured by the four foregoing photo-sensors. Then, a tracking error (TE) is calculated to obtain a tracking error signal, wherein TE=(A+D)−(B+C). Next, the phase difference between the seeking error signal and the tracking error signal are compared. When the phase of the seeking error signal leads that of the tracking error signal by 90°, the track searching direction is determined to be forward. On the other hand, when the phase of the seeking error signal lags that of the tracking error signal by 90°, the track searching direction is determined to be backward.

The method of determining a track searching direction according to one embodiment of the present invention further includes calculating a radio frequency ripple (RFRP) value to obtain a RFRP signal, wherein RFRP=(A+B+C+D). Then, a seeking error (SE) is calculated to obtain a SE signal, wherein SE=(A+B)−(D+C). Afterwards, the phase between the SE signal and the RFRP signal is compared. When the phase of the SE signal leads that of the RFRP signal by 90°, the track searching direction is determined to be forward. On the other hand, when the phase of the SE signal lags that of the RFRP signal by 90°, the track searching direction is determined to be backward.

In the method of determining a track searching direction according to one embodiment of the present invention, the optical pick-up head further includes four subsidiary photo-sensors for reading the light intensities of a sub-beam reflected from a top left position (E), a top right position (F), a bottom right position (G) and a bottom left position (H). The step of calculating the seeking error further includes calculating a sub-beam seeking error (SBSE), wherein SBSE=(E−F)−(H−G) and E, F, G and H represent the respective light intensities of the reflected sub-beam as measured by the four foregoing subsidiary photo-sensors. Then, the SBSE is subtracted from the SE to obtain the SE signal.

In the method of determining a track searching direction according to one embodiment of the present invention, the optical pick-up head further includes four subsidiary photo-sensors for reading the light intensities of a sub-beam reflected from a top left position (E), a top right position (F), a bottom right position (G) and a bottom left position (H). The step of calculating the seeking error further includes calculating a sub-beam seeking error (SBSE), wherein SBSE=(E+F)−(H+G) and E, F, G and H represent the respective light intensities of the reflected sub-beam as measured by the four foregoing subsidiary photo-sensors. Then, the SBSE is subtracted from the SE to obtain the SE signal.

In the method of determining a track searching direction according to one embodiment of the present invention, the seeking error further includes adding a shift or multiplying by a gain or a combination thereof.

In the present invention, the phase difference of light intensity between the front side and the rear side of the optical pick-up head is used to redefine a seeking error. The seeking error together with the tracking error (TE) signal and the radio frequency ripple (RFRP) signal are used to determine the track searching direction. As a result, the accuracy of detecting the track searching direction on a blank disk is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to make the content of the present invention more understandable, an actual example has been used to show the feasibility of the present invention.

When the optical pick-up head on an optical disc performs a track searching operation, a focusing lens moves in a one-dimensional straight line along the radial direction (that is, perpendicular to the tracks). However, the optical disc also spins continuously and incessantly. Thus, the focusing lens is actually not moving in a normal direction relative to the optical disc. In the following, the characteristic of this motion is utilized so that a seeking error (SE) signal defined in the present invention is compared with a tracking error (TE) signal and a radio frequency ripple (RFRP) signal respectively. Then, differences of phases are calculated to serve as a base for determining the track searching direction.

Figure 3:
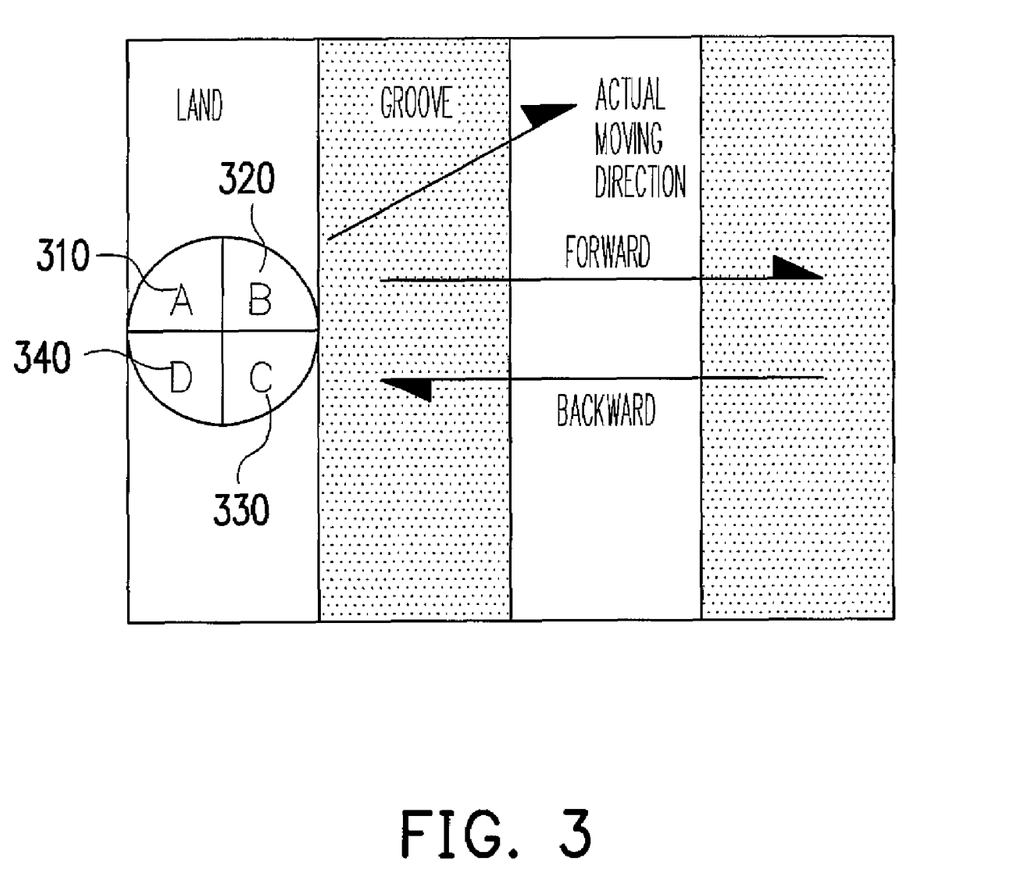
FIG. 3 is a diagram showing a track searching operation using an optical pick-up head according to one preferred embodiment of the present invention.
Figure 4:
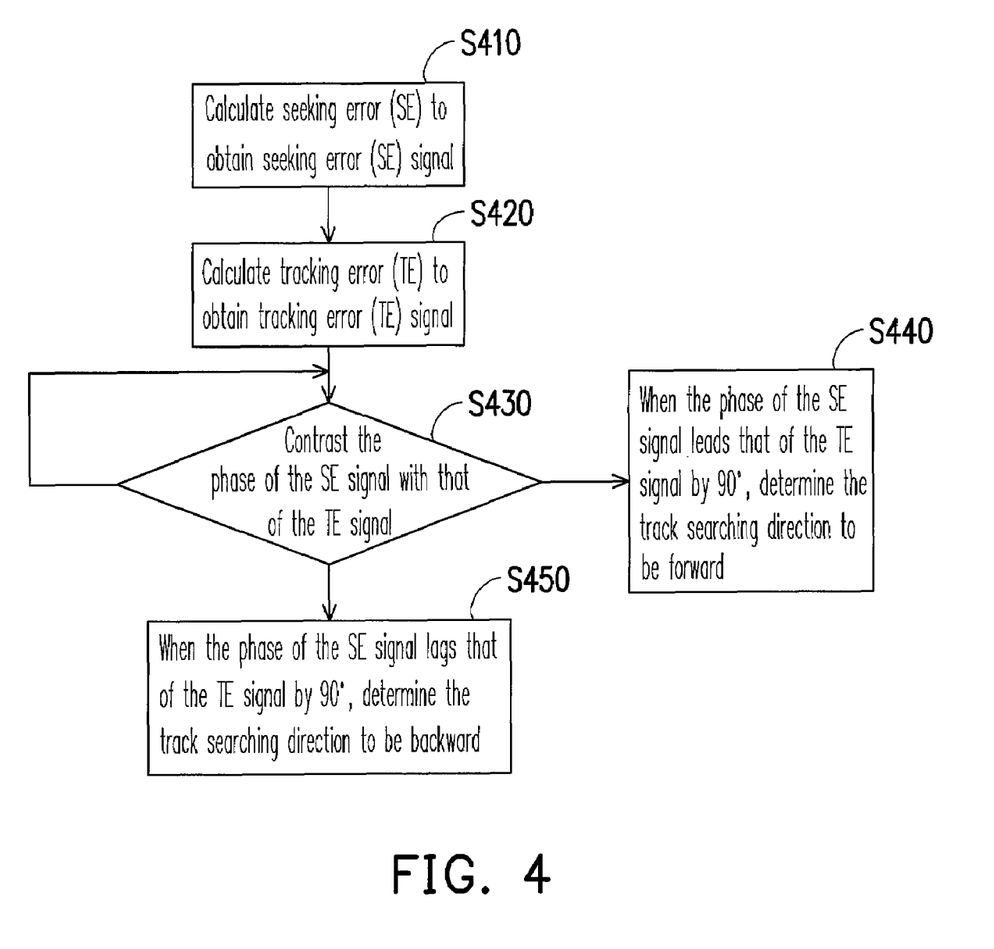
FIG. 4 is a flow diagram showing the steps of determining a track searching direction according to one preferred embodiment of the present invention.

FIG. 3 is a schematic diagram showing a track searching operation of an optical pick-up head according to one preferred embodiment of the present invention. FIG. 4 is a flowchart showing the steps of determining a track searching direction according to one preferred embodiment of the present invention. As shown in FIGS. 3 and 4, the optical pick-up head (not shown) includes a top left photo-sensor 310, a top right photo-sensor 320, a bottom right photo-sensor 330 and a bottom left photo-sensor 340 for reading the intensities of light reflected from a main beam. Since the optical disc spins continuously, the actual moving path of the optical pick-up head has an angle with respect to the originally prospected one.

Figure 5:
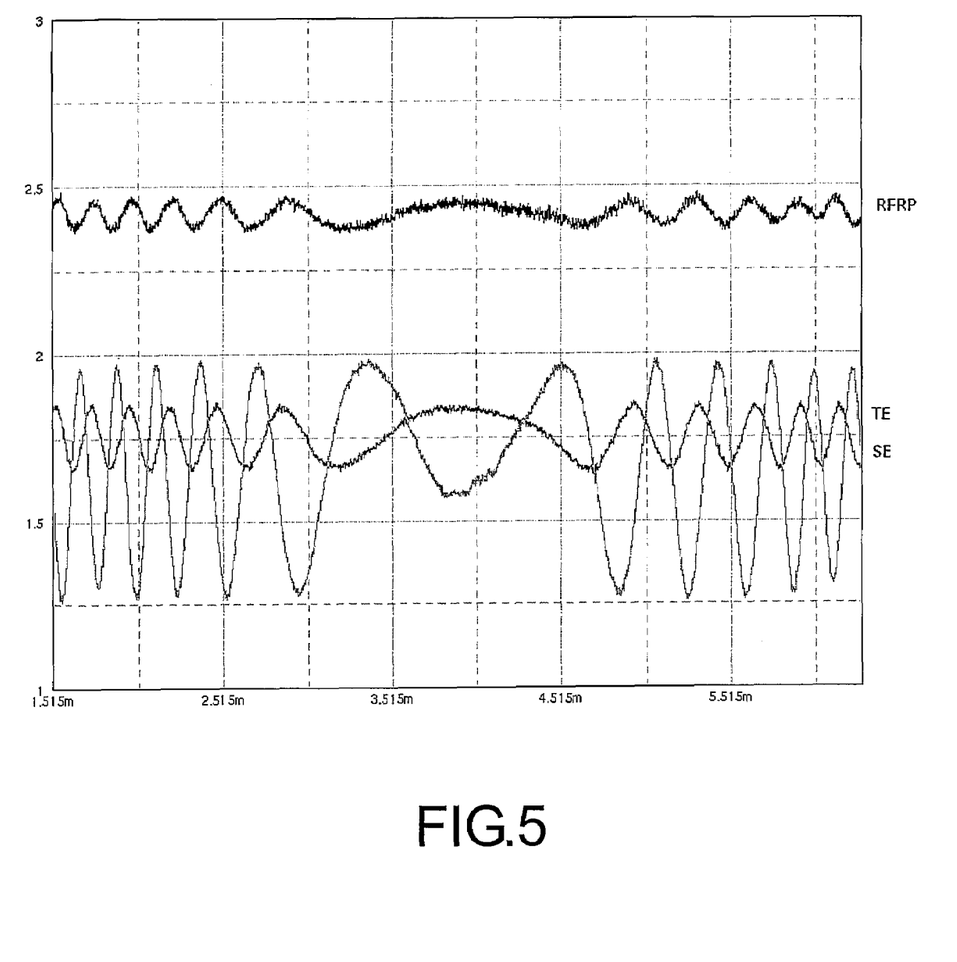
FIG. 5 is a diagram showing the traces of a seeking error signal, a tracking error signal and a radio frequency ripple signal and their phases relative to each other according to one preferred embodiment of the present invention.

Accordingly, the present embodiment redefines and calculates a seeking error (SE) to obtain a seeking error (SE) signal (in step S410). The formula for calculating the seeking error is: $SE=(A-B)-(D-C)$, wherein A, B, C and D represent the intensities of light reflected from a main beam as measured by the top left photo-sensor 310, the top right photo-sensor 320, the bottom right photo-sensor 330 and the bottom left photo-sensor 340 respectively. Because A and B are located at the front end of the optical pick-up head, there will be a phase difference between the track change detected by A and B and the one detected by C and D. By calculating the phase difference between $(A-B)$ and $(D-C)$, the common mode noise signal in A, B, C and D can be eliminated so that the signal-to-noise ratio of the obtained seeking error signal is better than that of the radio frequency ripple (RFRP) signal. FIG. 5 is a diagram showing the traces of a seeking error signal, a tracking error signal and a radio frequency ripple signal and their phases relative to each other according to one preferred embodiment of the present invention. As shown in FIG. 5, the seeking error (SE) signal has a bigger vibration magnitude than the radio frequency ripple (RFRP) signal. Hence, track changes can be detected more prominently.

In addition, a tracking error (TE) can be calculated to obtain a tracking error (TE) signal (in step S420). The formula for calculating the tracking error (TE) is: $TE=(A+D)-(B+C)$. Corresponding to the moving path of the optical pick-up head (refer to FIG. 3), B and C are located on the right half side of the optical pick-up head. Therefore, there is a phase difference between the track change detected by B and C and the one detected by A and D. Through the method of calculating the phase difference between $(A+D)$ and $(B+C)$, the difference in light intensity received by the photo-sensors on the left half side and the right half side of the optical pick-up head can be detected. Consequently, any changes in the tracks can be detected efficiently.

Then, the phase between the seeking error (SE) signal and the tracking error (TE) signal can be contrasted (in step S430). When the phase of the seeking error (SE) signal leads that of the tracking error (TE) signal by 90°, the track searching direction is determined to be forward (in step S440). Conversely, when the phase of the seeking error (SE) signal lags that of the tracking error (TE) signal by 90°, the track searching direction is determined to be backward (in step S450). Furthermore, in the process of contrasting the SE signal with the TE signal, the SE signal and the TE signal can be independently shifted or multiplied by a gain to further adjust the two signals so that a better contrast is obtained.

Because the quality of the radio frequency ripple (RFRP) signal is poor when a track searching operation is performed on a blank optical disc, the seeking error (SE) signal of the present invention can replace the RFRP signal and contrast with a tracking error (TE) signal. Thus, a better contrast between the error signals is obtained so that the track searching direction can be determined more accurately.

In addition, the present invention may also include a calculation of a radio frequency ripple (RFRP) value to obtain a radio frequency ripple (RFRP) signal. The RFRP can be calculated using a formula: $RFRP=(A+B+C+D)$. This RFRP signal can be used to contrast with a seeking error (SE) signal when the optical disc is found to contain data. When the phase of the SE signal leads that of the RFRP signal by 90°, the track searching direction is determined to be forward. Conversely, when the phase of the SE signal lags that of the RFRP signal by 90°, the track searching direction is determined to be backward.

Figure 6:
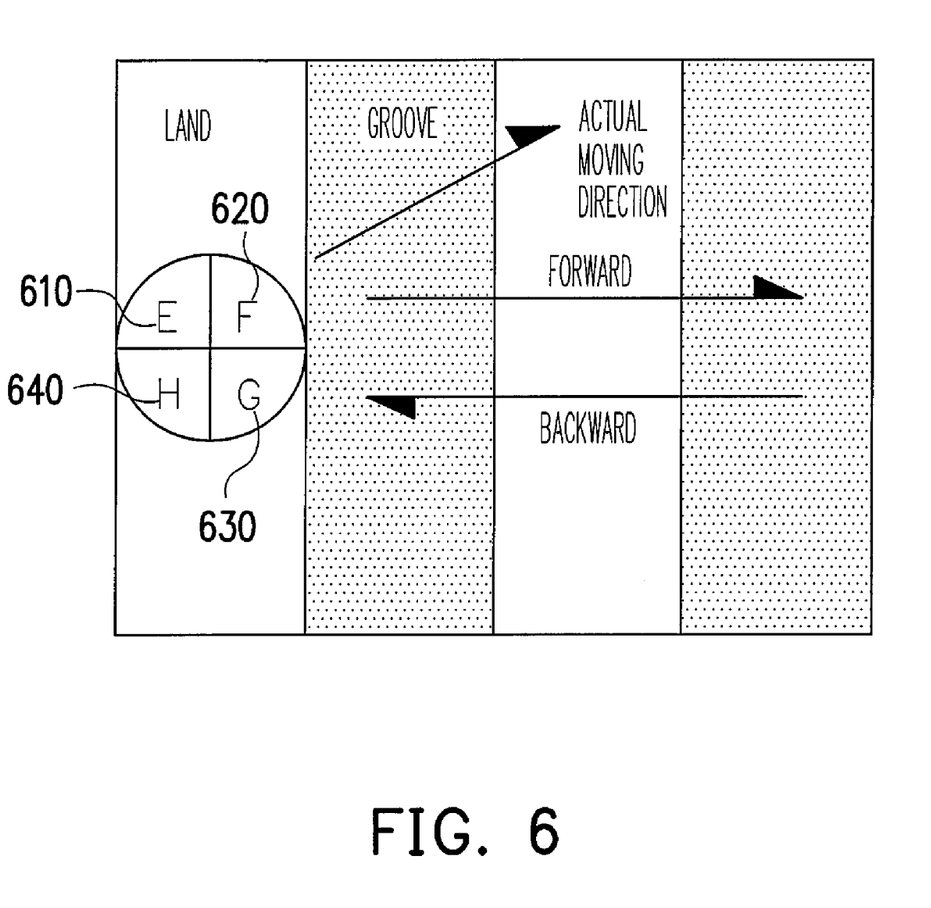
FIG. 6 is a diagram showing a track searching operation using an optical pick-up head according to one preferred embodiment of the present invention.

It should be noted that most optical pick-up heads in the market have photo-diodes for receiving the light reflected from a main beam and a sub-beam (as shown in FIG. 6) independently. The photo-diode for receiving the reflected sub-beam also includes a top left subsidiary photo-sensor 610, a top right subsidiary photo-sensor 620, a bottom right subsidiary photo-sensor 630 and a bottom left subsidiary photo-sensor 640. Similarly, according to the intensities of light received by the four subsidiary photo-sensors, a sub-beam seeking error (SBSE) can be calculated using the formula: SBSE=(E−F)−(H−G), wherein E, F, G and H represent the light intensities of the reflected sub-beam as measured by the top left subsidiary photo-sensor 610, the top right subsidiary photo-sensor 620, the bottom right subsidiary photo-sensor 630 and the bottom left subsidiary photo-sensor 640 respectively.

The sub-beam seeking error (SBSE) can be subtracted from the previously calculated main beam seeking error (MBSE) to obtain a new differential seeking error. The differential seeking error can eliminate the noise in the seeking error signal due to a shift in the focus, thereby further improving the signal-to-noise ratio of the seeking error signal.

In addition, in another embodiment of the present invention, the seeking error may be defined as SE=(A+B)−(D+C). Since A and B are located at the front end of the optical pick-up head, the phase difference between the phase of the photo-sensors A and B and the phase of the photo-sensors C and D can be detected by contrasting (A+B) and (D+C). Furthermore, the noise-to-signal ratio of the calculated seeking error signal is better than the radio frequency ripple (RFRP) signal.

The seeking error signal obtained by calculating the seeking error can also be used to contrast with either the tracking error signal or the radio frequency ripple signal to determine the track searching direction. The method of calculating the tracking error or the radio frequency ripple and the method of determining the track searching direction are identical to the foregoing embodiment so that a detailed description is omitted. Obviously, in the presence of photo-sensors in the optical pick-up head capable of reading the main beam and the sub-beam, the sub-beam seeking error may be subtracted from the main beam seeking error to obtain the best signal-to-noise ratio.

In summary, the method of determining the track searching direction in the present invention includes calculating a newly defined seeking error to obtain a seeking error signal. Then, the seeking error signal is used to contrast with an existing tracking error signal or a radio frequency ripple signal so that the track searching direction can be determined. The method has at least the following advantages:

1. The seeking error signal is obtained by contrasting the reflected light intensities received by the photo-sensors in the front side and the rear side of the photo-diode. Therefore, it has a higher signal-to-noise ratio than the conventional radio frequency ripple signal and hence is more suitable for determining the track searching direction of a blank optical disc.

2. The seeking error can eliminate the common mode noise signals of the four photo-sensors so that a better signal-to-noise ratio is obtained.

3. According to the differential seeking error obtained through receiving the reflected intensities of a main beam and a sub-beam, noise in the seeking error signal resulting from a shift in the focus can be eliminated so that the signal-to-noise ratio of the seeking error signal is further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of determining a track searching direction, suitable for determining the track searching direction of an optical pick-up head, the optical pick-up head includes a top left photo-sensor, a top right photo-sensor, a bottom right photo-sensor and a bottom left photo-sensor for reading the light intensities of a reflected main beam, comprising the steps of:

calculating a seeking error (SE) to obtain a seeking error signal, wherein SE=(A−B)−(D−C), and A, B, C, D respectively represent the light intensities of the reflected main beam measured by the top left photo-sensor, the top right photo-sensor, the bottom right photo-sensor and the bottom left photo-sensor;

calculating a tracking error (TE) to obtain a tracking error signal, wherein TE=(A+D)−(B+C); and contrasting the phase of the seeking error signal with that of the tracking error signal, wherein, when the phase of the seeking error signal leads that of the tracking error signal by 90°, the track searching direction is determined to be forward, and when the phase of the seeking error signal lags that of the tracking error signal by 90°, the track searching direction is determined to be backward.

2. The method of claim 1, further comprising:

calculating a radio frequency ripple (RFRP) value to obtain a radio frequency ripple (RFRP) signal, wherein RFRP=(A+B+C+D); and contrasting the phase of the seeking error signal with that of the radio frequency ripple signal, wherein, when the phase of the seeking error signal leads that of the radio frequency ripple signal by 90°, the track searching direction is determined to be forward, and when the phase of the seeking error signal lags that of the radio frequency ripple signal by 90°, the track searching direction is determined to be backward.

3. The method of claim 1, wherein the optical pick-up head further comprises a top left subsidiary photo-sensor (E), a top right subsidiary photo-sensor (F), a bottom right subsidiary photo-sensor (G) and a bottom left subsidiary photo-sensor (H) for reading the light intensities of a reflected sub-beam, and the steps for calculating the seeking error comprise:

calculating a sub-beam seeking error (SBSE), wherein SBSE=(E−F)−(H−G), and E, F, G and H represent the light intensities of the reflected sub-beam measured by the top left subsidiary photo-sensor (E), the top right subsidiary photo-sensor (F), the bottom right subsidiary photo-sensor (G) and the bottom left subsidiary photo-sensor (H) respectively; and subtracting the sub-beam seeking error from the seeking error to obtain the seeking error signal.

4. The method of claim 1, wherein a shift is further added to the seeking error.

5. The method of claim 1, wherein the seeking error is further multiplied by a gain.

6. A method of determining a track searching direction, suitable for determining the track searching direction of an optical pick-up head, the optical pick-up head includes a top left photo-sensor, a top right photo-sensor, a bottom right photo-sensor and a bottom left photo-sensor for reading the light intensities of a reflected main beam, comprising:

calculating a seeking error (SE) to obtain a seeking error signal, wherein SE=(A+B)−(D+C), and A, B, C, D represent the light intensities of the reflected main beam measured by the top left photo-sensor, the top right photo-sensor, the bottom right photo-sensor and the bottom left photo-sensor;

calculating a tracking error (TE) to obtain a tracking error signal, wherein TE=(A+D)−(B+C); and contrasting the phase of the seeking error signal with that of the tracking error signal, wherein, when the phase of the seeking error signal leads that of the tracking error signal by 90°, the track searching direction is determined to be forward, and when the phase of the seeking error signal lags that of the tracking error signal by 90°, the track searching direction is determined to be backward.

7. The method of claim 6, further comprising:

calculating a radio frequency ripple (RFRP) value to obtain a radio frequency ripple signal, wherein RFRP=(A+B+C+D); and contrasting the phase of the seeking error signal with that of the radio frequency ripple signal, wherein, when the phase of the seeking error signal leads that of the radio frequency ripple signal by 90°, the track searching direction is determined to be forward, and when the phase of the seeking error signal lags that of the radio frequency ripple signal by 90°, the track searching direction is determined to be backward.

8. The method of claim 6, wherein the optical pick-up head further comprises a top left subsidiary photo-sensor (E), a top right subsidiary photo-sensor (F), a bottom right subsidiary photo-sensor (G) and a bottom left subsidiary photo-sensor (H) for reading the light intensities of a reflected sub-beam, and the steps for calculating the seeking error comprise:

calculating a sub-beam seeking error (SBSE), wherein SBSE=(E+F)−(H+G), and E, F, G and H represent the light intensities of the reflected sub-beam measured by the top left subsidiary photo-sensor (E), the top right subsidiary photo-sensor (F), the bottom right subsidiary photo-sensor (G) and the bottom left subsidiary photo-sensor (H) respectively; and subtracting the sub-beam seeking error (SBSE) from the seeking error to obtain the seeking error signal.

9. The method of claim 6, wherein a shift is further added to the seeking error.

10. The method of claim 6, wherein the seeking error is further multiplied by a gain.

* * * * *